(12) United States Patent
Watwood et al.

(10) Patent No.: US 7,261,309 B2
(45) Date of Patent: *Aug. 28, 2007

(54) WHEELCHAIR DRIVE MECHANISM

(75) Inventors: Brian M. Watwood, Granite Bay, CA (US); Duane DeJong, Elk Grove, CA (US); Errol C. Armstrong, Gilroy, CA (US)

(73) Assignee: Watwood, Inc., Granite Bay, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/094,740

(22) Filed: Mar. 29, 2005

(65) Prior Publication Data

US 2005/0167942 A1 Aug. 4, 2005

Related U.S. Application Data

(63) Continuation of application No. 10/308,511, filed on Dec. 2, 2002, now Pat. No. 6,893,035.

(51) Int. Cl.
*B62M 1/14* (2006.01)

(52) U.S. Cl. .................................. 280/244; 280/250.1
(58) Field of Classification Search ............ 280/242.1, 280/244, 249, 250.1, 253, 256, 257, 236–238, 280/247, 304.1
See application file for complete search history.

(56) References Cited

U.S. PATENT DOCUMENTS

| 4,865,344 | A * | 9/1989 | Romero et al. ............... 280/255 |
| 5,020,815 | A * | 6/1991 | Harris et al. ................. 280/246 |
| 5,632,499 | A * | 5/1997 | Hutcherson et al. ......... 280/246 |
| 6,234,504 | B1* | 5/2001 | Taylor ...................... 280/250.1 |
| 6,893,035 | B2* | 5/2005 | Watwood et al. ......... 280/242.1 |

\* cited by examiner

*Primary Examiner*—Kevin Hurley
(74) *Attorney, Agent, or Firm*—Audrey A. Millemann; Weintraub Genshlea Chediak

(57) ABSTRACT

A wheelchair which shifts between forward and reverse by virtue of a roller mechanism which grabs in one direction and slips an opposite direction, thereby preventing binding. The shift mechanism is initiated by rotation of a shift paddle which is located on a extremity of a lever arm remote from the roller mechanism.

2 Claims, 10 Drawing Sheets

FORWARD

NEUTRAL

REVERSE

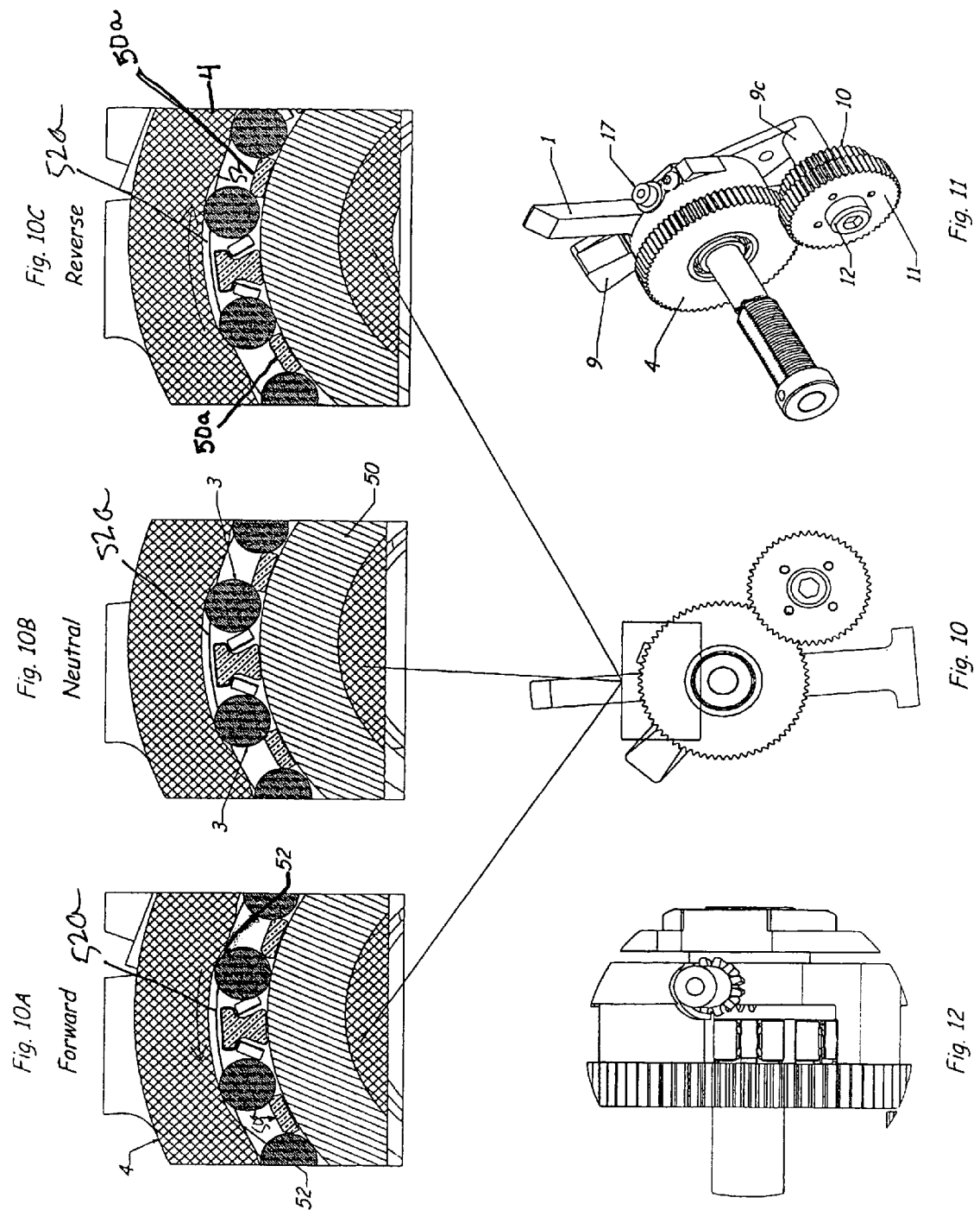

WHEELCHAIR DRIVE MECHANISM

CROSS REFERENCE TO RELATED APPLICATION

This application is a continuation of U.S. application Ser. No. 10/308,511, filed on Dec. 2, 2002, U.S. Pat. No. 6,893,035 issued May 17, 2005.

FIELD OF THE INVENTION

The following invention relates generally to instrumentalities for driving land vehicles. More particularly, the instant invention is directed to an occupant propelled wheelchair.

BACKGROUND OF THE INVENTION

Occupant propelled wheelchairs typically require that the occupant of the chair grasp a portion of a rim adjacent a wheel thereof and propel the wheelchair by moving one's hand through an arc of a circle immediately adjacent the wheel of the chair.

Some wheelchair occupants, however, cannot easily perform this movement due to limitations in their own range of motion and typically, therefore must resort to propelling a wheelchair by other means, such as via battery power.

Certain earlier patents held by the present Patentee, having recognized this deficiency, teach alternative mechanisms to accommodate a wheelchair occupant to self-propel the wheelchair using a different range of motion. The following patents reflect Patentee's prior activities:

| PATENT NO. | ISSUE DATE | INVENTOR |
|---|---|---|
| 5,263,729 | Nov. 23, 1993 | Watwood et al. |
| 6,007,082 | Dec. 28, 1999 | Watwood et al. |

SUMMARY OF THE INVENTION

The present invention chronicles Patentee's ongoing efforts to provide an improved operating mechanism to allow a wheelchair occupant to enjoy improved wheelchair transportation.

The present invention particularly addresses gear loading in the drive transmission, which heretofore prevented facile shifting in certain circumstances, particularly when the wheelchair was located adjacent an abutment or was poised on an incline.

The instant invention features a system which is substantially impervious to the kind of gear loading that normally resides in such instances such that the direction of gear engagement between forward and reverse can proceed substantially unencumbered irrespective of the terrain associated with the wheelchair.

An instrumentality is provided which is operatively intercoupled with the forward and reverse gear sets to promulgate shifting there between by virtue of a plurality of cylindrical rollers each of which provide the driving link between trains of gears. The plurality of rollers are biased in either of two directions against spring pressure which dictate the drive direction. These plurality of rollers collectively distribute the load over relatively small arcs of the roller surface. As a consequence, very little work is required to shift the plurality of rollers from a first orientation to a second orientation merely against the spring pressure which thus reverses the direction. A third medial orientation of the rollers is possible which defines a neutral position.

OBJECTS OF THE INVENTION

Accordingly, an object of the present invention to provide a new and novel drive system for a land vehicle such as a wheelchair.

A further object of the present invention is to provide a wheelchair as characterized above which is safe to use, easy to operate and the structure lends itself to mass-production techniques.

A further object of the present invention is to provide a device as characterized above which minimizes gear train loading when the wheelchair is on an incline or against an abutment.

A further object of the present invention is to provide a device as characterized above which can be readily retrofitted onto existing wheelchairs or can be the subject of new manufacture.

A further object of the present invention is to provide a device as characterized above which is extremely durable in construction and reliable in use.

Viewed from a first vantage point, it is an object of the present invention to provide a wheelchair drive mechanism, comprising, in combination: a lever arm having a hand grip end and a drive end, a wheel, a transmission interposed between the lever arm and the wheel including means to bias the transmission into either a forward direction or a reverse direction, the biasing means attached at the lever arm hand grip end.

These and other objects will be made manifest when considering the following detailed specification when taken in conjunction with the appended drawing figures.

DESCRIPTION OF THE DRAWING FIGURES

FIGS. 10A-10C are an alternative to FIG. 2.

FIG. 11 is a perspective further detailing the invention.

FIG. 12 is a top view of FIG. 11.

Figure 13:
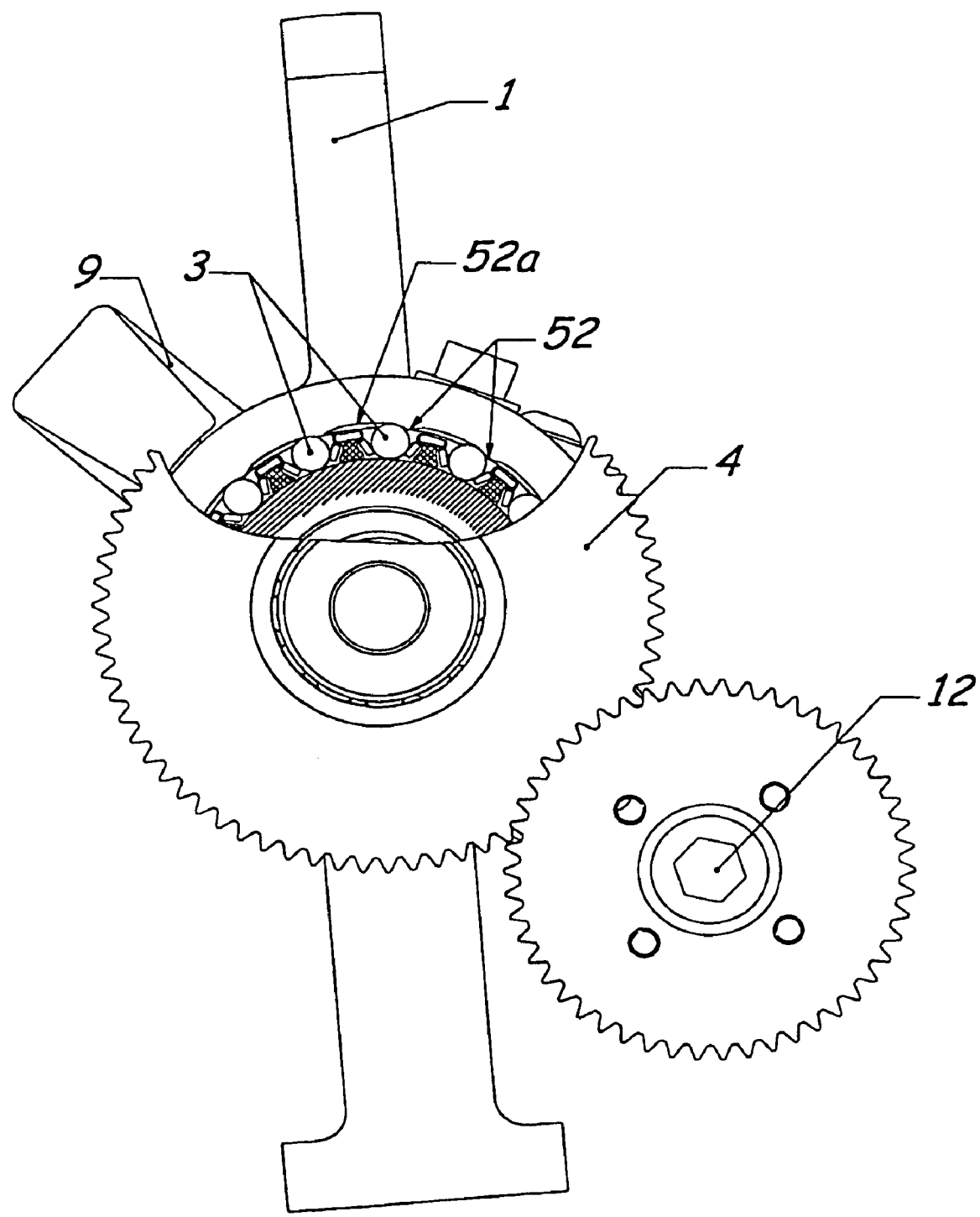

FIG. 13 elaborates a variation of FIGS. 10A-10C.

BRIEF DESCRIPTION OF THE PREFERRED EMBODIMENT

Referring to the drawings, wherein like reference numerals denote like parts, reference numeral 100 is directed to the wheelchair transmission mechanism according to the present invention.

Figure 1:
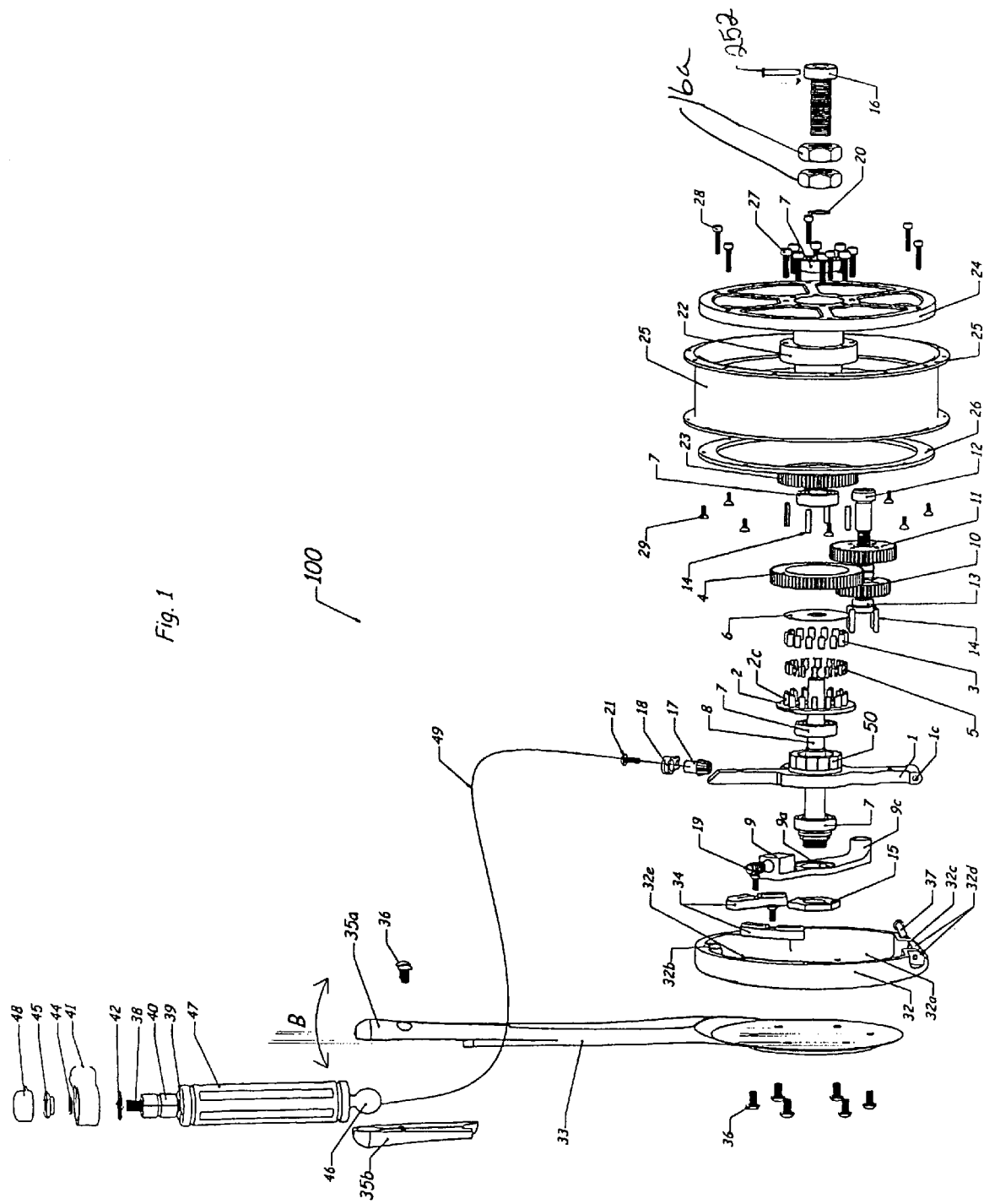
FIG. 1 is an exploded parts perspective of the drive train according to the present invention.
Figure 6:
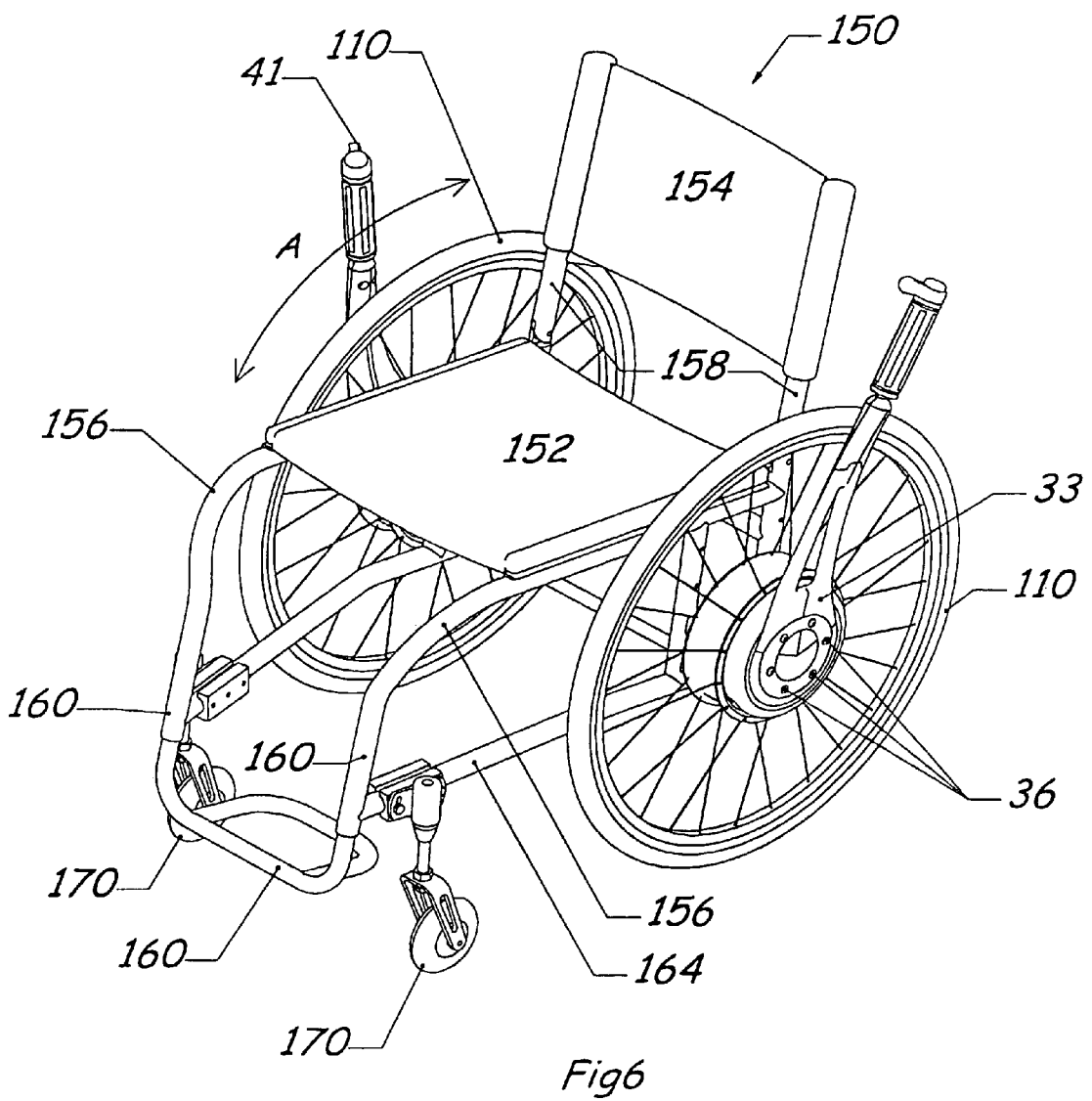
FIG. 6 is a perspective of the wheelchair with the device integral therewith.
Figure 7:
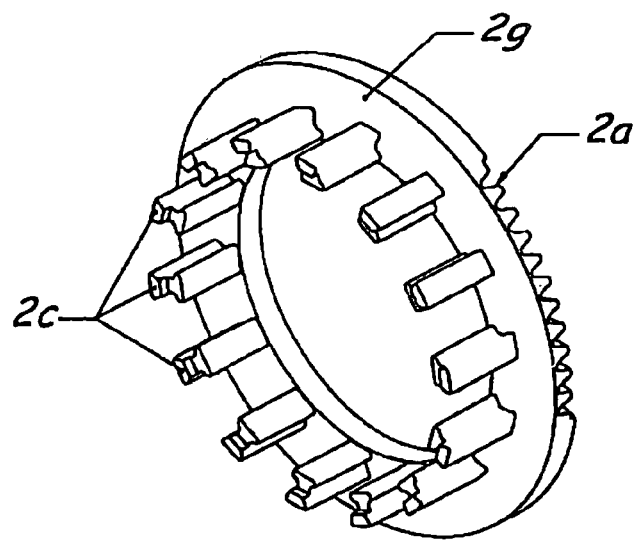
FIG. 7 is a perspective of the shift cage.
Figure 8A:
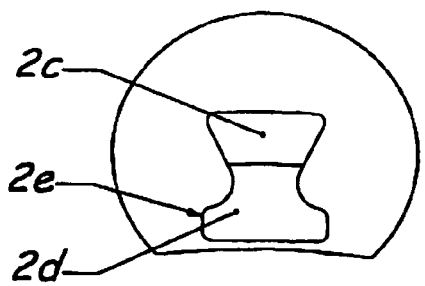
FIG. 8a is a front view of one post on the shift cage.
Figure 8B:
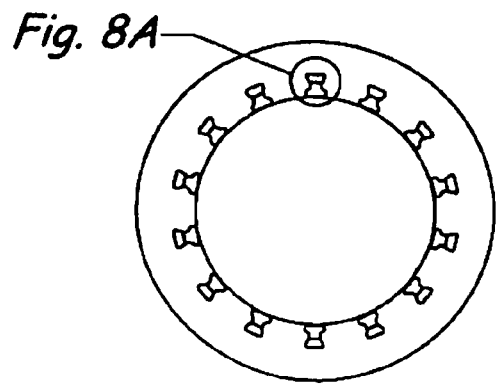
FIG. 8b is a front view of the shift cage.

In its essence, a lever arm 33 is operatively coupled to each wheel 110 of a wheelchair 150 (FIG. 6) through a transmission mechanism 100 so that arcuate motion of the lever arm 33 along arrow "A" causes corresponding movement of the wheelchair wheel 110 to propel the wheelchair 150. In addition, a shift paddle 41 (FIG. 1) is operatively coupled to a set of gears 4, 10, 11, and 23 through a shift cage 2 having a plurality of rollers 3 supported therein by means of a plurality of springs 5 to exert pressure on the rollers and to cause forward or rearward engagement.

More particularly, the lever arm 33 includes an upper end, a lower end and a medial portion. The lower end is substantially disc shaped and connects to a lever base 32 by a means of a plurality of screws 36. The medial portion of the lever arm 33 is formed as an elongate somewhat cylindrical stock member having sufficient thickness to retard flexure while the upper end is a clamp 35 formed from two halves, one half 35a integral with the medial portion, and another half 35b adapted to be fastened to the integral half by means of a pair of screws 36. The handle clamp 35 supports a handle grip 47 by means of a lower handle ball 46 frictionally held in the upper portion of lever arm 33 by the handle clamp 35. The handle ball 46 can allow a multiplicity of orientations of the handle grip 47 by articulation of the ball 46 within a complementarily formed socket located within the halves of the handle clamp 35 and held into place by means of the screws 36.

A shift retainer 38 projects up from the handle grip 47 and has a shaft portion which receives in the order shown, a wedge 40 lying between a retaining cap 39 and a shift spring 42 which underlies the shift paddle 41. Next follows a lock shim 44, then a shift paddle retainer 45 concluded by a shift cap 48. A shift cable 49 is centrally located within the shift retainer 38 and has a free end projecting upwardly operatively coupled to the shift paddle 41 and will be explored further. The remainder of cable 49 extends through grip 47, ball 46 and arm 33, exiting into the transmission 100, connected to bevel gear 17.

Figure 5:
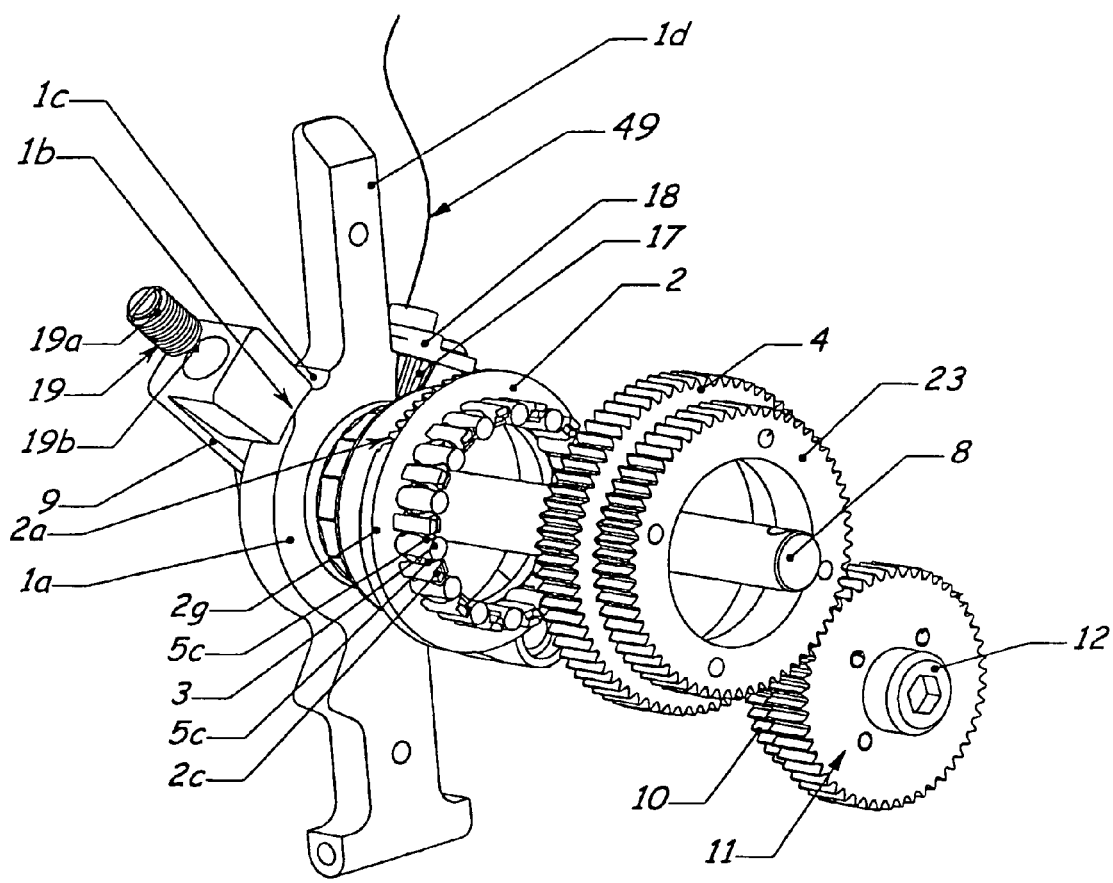
FIG. 5 shows a magnified view of one portion of FIG. 4.

The lever base 32 appears as a generally cylindrical band of material on its exterior. It has a closed end wall 32a adjacent the disc shaped lever arm 33 lower end to allow attachment of the lever arm lower end thereto and includes a hollow interior. In addition, the lever base 32 supports at its hollow interior thereof at approximately 2 o'clock and 10 o'clock, a pair of brake pads 34 whose operation will be discussed shortly. Interposed between the brake pads and located at 12 o'clock, is a first slit 32b. At a bottommost portion of the lever base 32, (i.e. at 6 o'clock) is a second slit 32c. Collectively these two slits support a drive link 1 and, as shown in the drawings, the drive link 1 has a bore 1c which is pinned via clevis pin 37 at a lower-most extremity thereof to the six o'clock slit 32c via apertures 32d shown in the drawing. The drive link 1 is centrally supported on an axle 8. Interposed between the drive link 1 and the lever base 32 is a lever stop 9 which is constrained on the axle 8. More particularly, a free end of the axle 8 has a plurality of threads thereon and a central portion of the lever stop 9 has an aperture 9a which passes thereover. A spanner nut 15 securely locates the lever stop 9 adjacent the threaded end of the axle 8. The axle 8 permits motion of lever stop 9 as to be described. A pair of bearings 7 appear on the axle 8 on both sides of the drive link 1. With the mechanism as thus described, the drive link 1 is free to move in conjunction with the lever arm 33 by virtue of its free ends being disposed within the slits 32b, c described on the lever base 32. The degree to which the drive link 1 can move may be determined by the relationship of the lever stop 9 to the drive link 1 on the axle 8. For example, when the drive link 1 co-acts with the lever stop 9, the arcuate motion of the lever arm 33 may stop. FIG. 5 shows that the drive link 1 has a central hub 1a provided with a raised boss 1b followed by a notch 1c adjacent to upper drive link 1d. Lever stop 9 includes a detent 19 having a detent ball 19b biased by spring and grub screw 19a. Ball 19b rests in notch 1c to provide a stop for drive link 1. The purpose of the lever stop 9 and detent 19 is to allow manual use of wheel 110 without the lever arm 33 interfering with grasping the wheel 110. This occurs when the transmission is in neutral.

The central hub 1a of the drive link 1 also serves as a supporting area to receive a gear retainer 18 thereon. The gear retainer 18 supports a bevel gear 17 such that a portion of the bevel gear is exposed. This bevel gear 17 is dimensioned to mesh with a disc shaped shift cage 2 in which a peripheral portion of the shift cage is also provided with teeth 2a that mesh with the bevel gear 17. An end of the cable 49 remote from the hand grip 47 terminates on an end of the bevel gear 17 whereby rotation of the cable 49 causes corresponding rotation of the bevel gear 17. By virtue of the meshing connection between the bevel gear 17 and the gear teeth 2a on the shift cage 2, the shift cage 2 can be moved in an arc of a circle. Note the shift cage 2 has a central hollow. Note also the teeth 2a preferably do not circumscribe the entire disc portion 2b of shift cage 2.

Figure 2A:
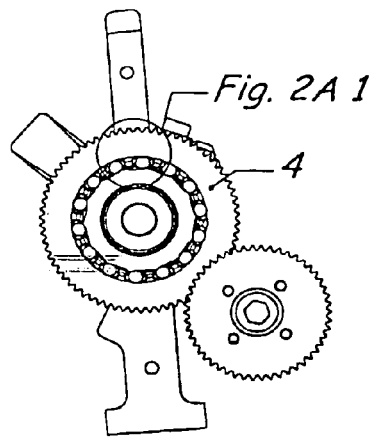
FIGS. 2A-2C are details of the roller mechanism which allows shifting to occur easily.
Figure 2A:
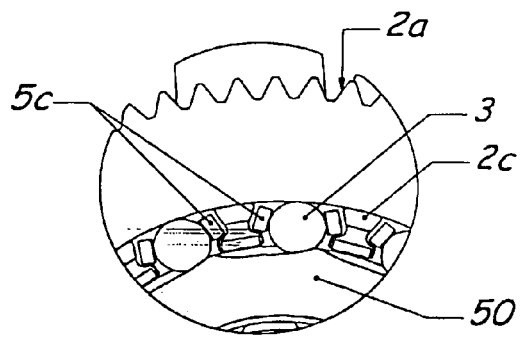
Figure 2B:
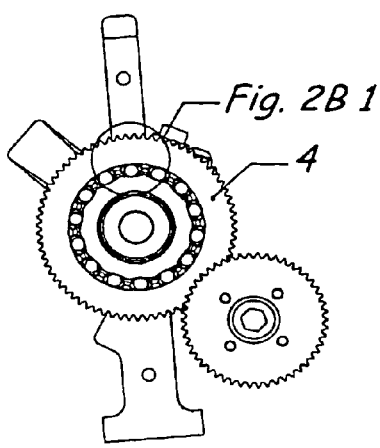
Figure 2B:
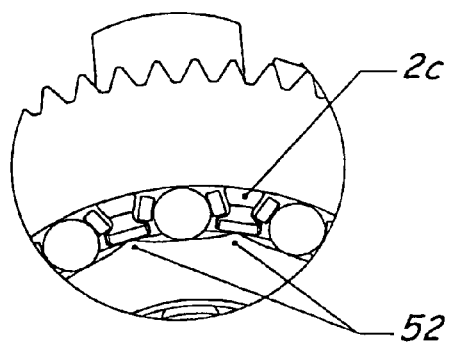
Figure 2C:
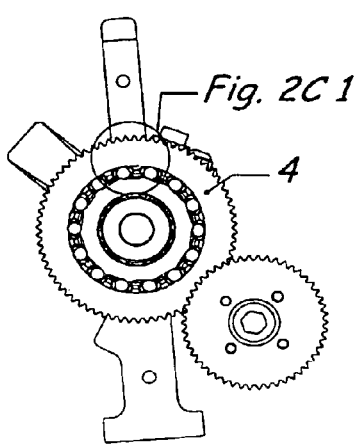
Figure 2C:
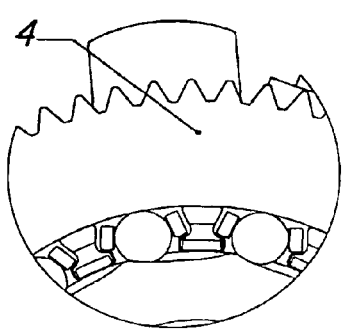
Figure 3:
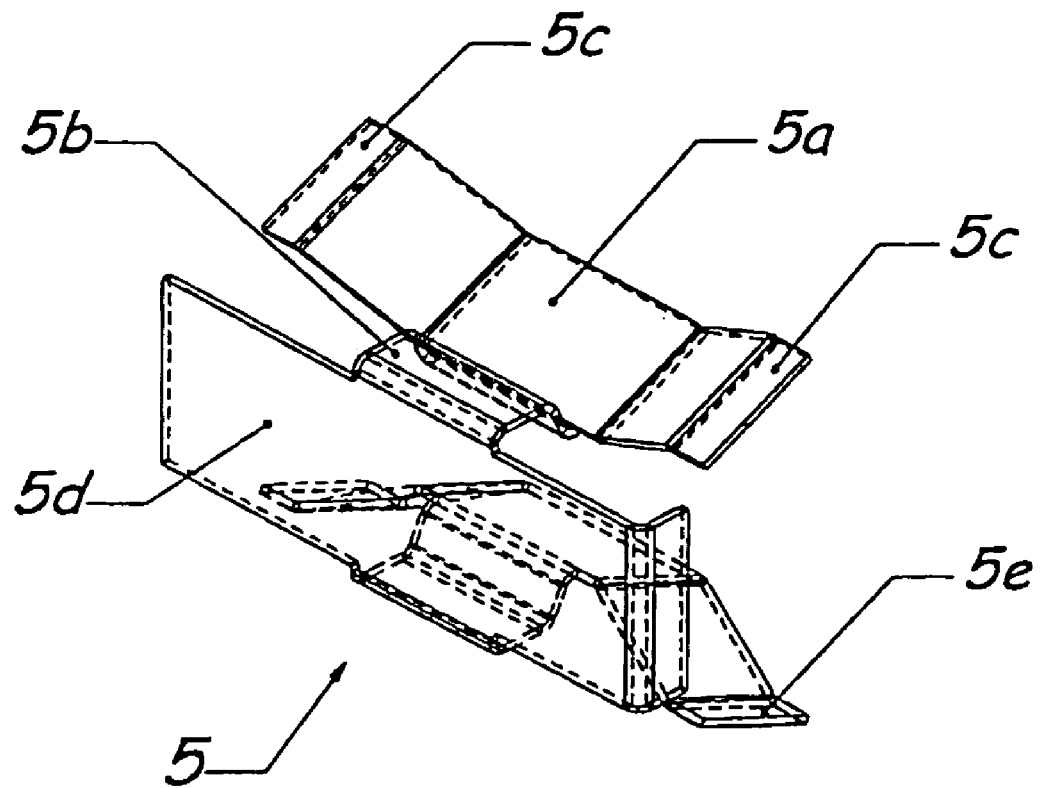
FIG. 3 is a perspective view of a spring element associated with the FIG. 2 drawing.
Figure 4:
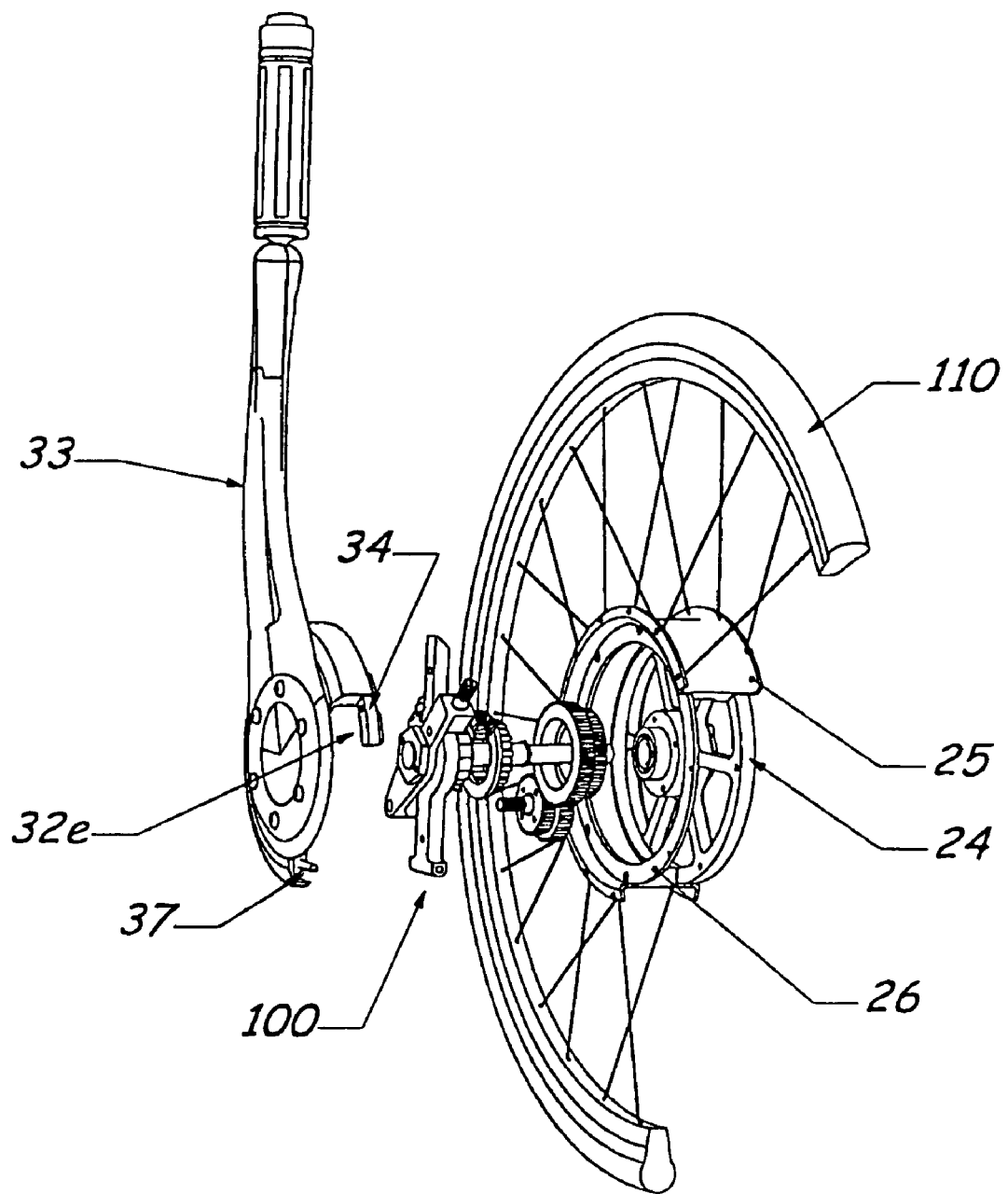
FIG. 4 is a perspective view of the assembly to be incorporated within a wheel.

The shift cage 2 (FIGS. 2, 3, 5, 7 and 8) also includes a plurality of spring support posts 2c projecting from one side of the disc 2b remote from the drive link 1. Each of the posts 2c is spaced one from the other by a slightly larger diameter than a plurality of interposed cylindrical roller pin bearings 3 therebetween. Each roller 3 is a substantially cylindrical construct and serves as a bearing disposed between two posts 2c. Each post 2c also supports a spring 5 such as the one shown in FIG. 3. The spring 5 is dimensioned such that one spring 5 can ride over each post 2c in secure engagement. Each post 2c is substantially a hybrid inverted T-shape hourglass (e.g., FIG. 2a) and the spring 5 has a somewhat complemental contour to the inverted T part 2c which lies on shift cage 2 closest to the central hollow. That is spring base 5d underlies 2d of post 2c and webs 5b gird sides 2e of the "T". In addition, each spring 5 includes a pair of outwardly flared walls 5a having a compound contour that terminates in four bearing surfaces 5c such that two springs 5 contact and co-act against the annular surface of each roller 3 between two posts 2c. Thus, each roller 3 is contacted by two different springs 5. Also each spring contacts two rollers 3. The roller pins 3 are held in position on the shift cage 2 by means of a shim 6 (FIG. 1) located on a side of the post 2 opposite the drive link 1.

In addition to the shim 6 retaining the rollers 3 in position, a large annular gear 4 overlies the shift cage 2 and receives rotary motion as a function of the orientation of the rollers in the cage 2 as it is biased by the springs 5 and influenced in turn by the orientation of the bevel gear 17 and the corresponding gear 2a on the shift cage 2. That is to say, in one direction (FIG. 2a) the gear 4 engages forward, while in the opposite direction (FIG. 2c) it engages reverse, depending upon the proximity of the roller 3 with respect to cam disc 50 located on drive link 1. Cam disc 50 passes through the central hollow of shift cage 2 and cam points 52 contact roller 3. When the points 52 contact with roller 3, the point location (FIG. 2A, 2C) determines the direction of drive. When the roller is shown in the neutral position of FIG. 2B, it is biased for traction in neither direction and defines neutral which allows manual rotation of wheels 110 as is conventional.

Another variation to the cam points 52 of FIG. 2 is shown in FIGS. 10A-10C. Only the salient divergence will be delineated here. Whereas in FIG. 2 one roller 3 transitions between two cam points 52, in FIGS. 10A-10C it is seen that two rollers 3 are relegated, one to each of a pairs of cam points 52, one roller per cam point.

Further, the cam point pairs 52 are both located with an intervening cam pocket 52a (FIG. 13) disposed there between which pocket 52a captures the two rollers 3 as well as the spring 5 and post 2. Spring 5 and post 2 separate the two rollers 3. As shown in FIG. 10a, when going "forward" only the "right" viewed roller is working; in "reverse", only the left viewed roller (FIG. 10c) is working. FIG. 10b shows neutral when neither roller works.

Adjacent pockets 52a are spaced one from the other by abutments 2d formed on cage 2. The shift case posts 2C are inverted in FIGS. 10A-C (compared to FIG. 8A) as are the springs 5. Spacers 50a separate adjacent rollers in differing pockets and can be integral with annular disc 50 or separate. Notice also that compared to FIG. 2, the cam points 52 are located on gear 4 in FIG. 10A-10C, not on cam disc 50 which is pictured as annular in FIG. 10A-10C where it is in contact with rollers 3. Detailed examples of how these machine elements (e.g. roller and cam) can operate may be found in conventional clutches. See U.S. Pat. Nos. 3,476, 226 and 6,044,944.

FIG. 13 shows a further variation over FIG. 2. Notice a single roller 3 is disposed in a pocket 52a and the cam points 52 are located on the outer coupling to gear 4.

In all cases, rotation of bevel gear 17 coacts with teeth 2a to change the roller orientation between forward, reverse and neutral. The bevel gear 17 is rotated by paddle 41 through cable 49.

As the drive link 1 rotates, it co-acts with the lever stop 9 as described. A free end 9c of the lever stop 9 may support two gears 10, 11 on a bolt 12 and pinned together with spring pins 14 allowing both gears 10, 11 to move together in an arc. Gear 10 is oriented to mesh with gear 4. Gear 11 is oriented to mesh with a final output gear 23 which is axially aligned with the gear 4 but spaced therefrom by a bearing 7. Gears 4, 23 overlie axle 8. This configuration allows gear changes by substituting different combinations of gears having different gear ratios and supports installation of different sets of gears to correlate with operator strength. This also provides the incremental periodic driving contact that occurs during the motion of the lever arm 33 in only one arc of travel.

The final output gear 23 is operatively coupled to a spoked wheel 24 via spring pins 14. Spoked wheel 24 has a plurality of spokes emanating radially outward therefrom. These spokes are preferably rod like. The exterior periphery of the spoked wheel 24 nests within an inner rim 25 that is operatively coupled to the wheel 110 on the wheelchair 150 via wire spokes thinner than rod like spokes on wheel 24. Thus, rotation of the gear 23 induces rotation of the spoked wheel 24 and thence to the inner rim 25. Bolts 27 fix wheel 24 to a hub 22 which overlies axle sleeve 16 which, in turn, connects to axle 8 on an end thereof opposite spanner nut 15.

The inner rim 25 has a brake disc 26 disposed on a face thereof adjacent the brake pads 34. As can be seen, contact of the brake pads 34 against the brake disc 26 will discourage wheel rotation. The brake pads 34 move toward disc 26 by movement of lever arm 33 along arrow B. The brake pads 34 reside within pockets 32e formed on lever base 32. The disc 26 is held on rim 25 by bolts 29.

Figure 9A:
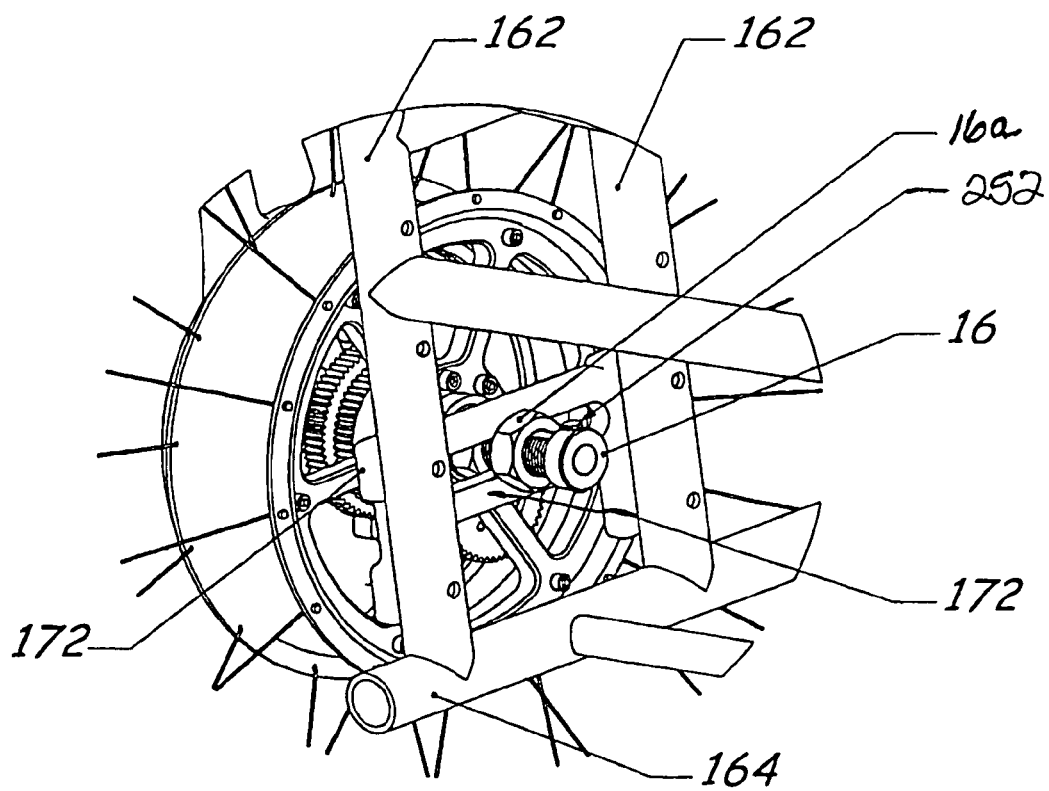
FIG. 9a is a perspective view taken from FIG. 9.
Figure 9:
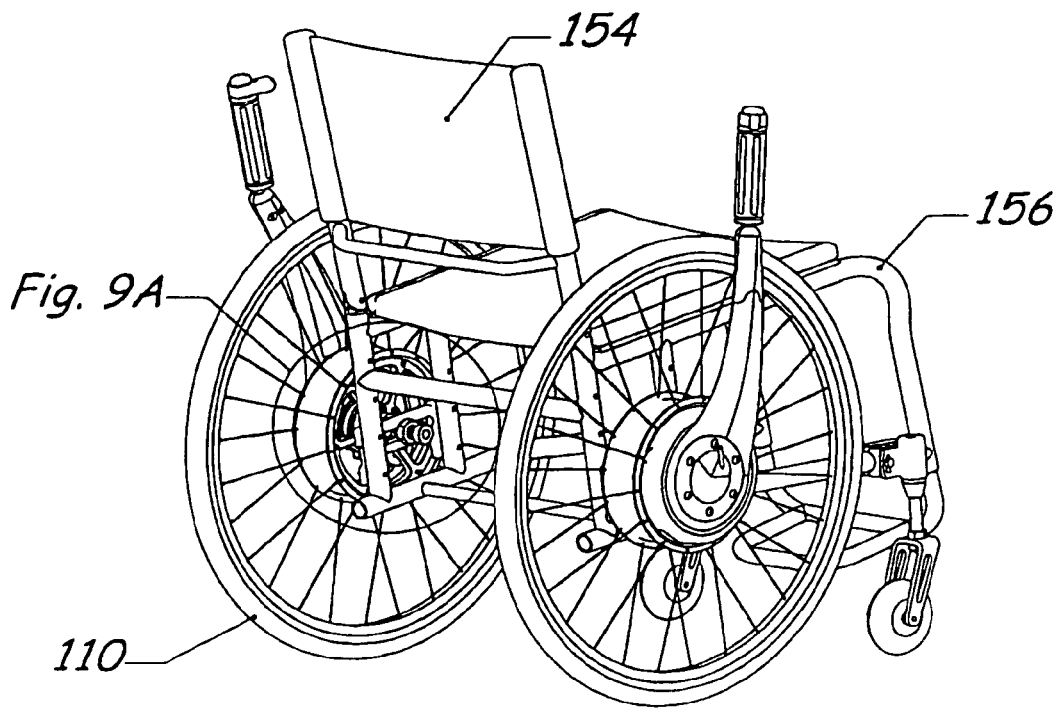
FIG. 9 is a rear perspective view of the wheelchair.

The wheelchair 150 (FIGS. 6, 9, and 9A) include a seat 152, a back 154, a pair of lateral rails 156 which support the seat 152 interconnected to a pair of vertical rails 158 which support the back. These rails are supported on frame grid formed of vertical struts 162 connected to horizontal struts 164. Horizontal struts 164 and lateral rails 156 terminate in an inverted U shaped forward located down tube 160. Casters 170 depend from forward portions of horizontal struts 164. Wheels (FIG. 9A) mount to the frame grid via spaced, parallel horizontal braces 172 spanning the two vertical struts 162 on each side of the wheelchair 150. As shown, the axle sleeve 16 is captured on braces 172 and holds the transmissions on each wheel by a pair of captive nuts 16a which straddle the braces 172. A locking pin 252 passing through the sleeve and/or optionally through outboard nut 16a adds security.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A wheelchair drive mechanism comprising in combination:

a lever arm having a hand grip end and a drive end, a wheel, a transmission interposed between said lever arm and said wheel including means to bias said transmission into either a forward direction or a reverse direction, said biasing means attached at said lever arm hand grip end; and wherein said biasing means includes a shift paddle projecting radially from said hand grip end, said paddle operatively coupled to a cable having an end terminating in said transmission.

2. A wheelchair, comprising in combination:

a frame having non-driven wheel means, a seat area supported by said frame, a lever means, driving wheels coupled to said frame and said lever means, shift means located on said lever means and biasing means on said driving wheels to induce forward and reverse motion and wherein said biasing means includes a shift paddle projecting radially from a hand grip end of said lever means, said paddle operatively coupled to a cable having an end terminating in a transmission.

* * * * *